C. PICKLES.
NUT-LOCK.

No. 181,716. Patented Aug. 29, 1876.

WITNESSES.
Thos. H. Peabody
Lewis B. Beach

INVENTOR.
Charles Pickles

UNITED STATES PATENT OFFICE.

CHARLES PICKLES, OF ST. LOUIS, MO., ASSIGNOR, BY MESNE ASSIGNMENTS, TO WILLIAM W. WELLS, TRUMAN L. HOLMES, AND DAVID T. WELCH, OF SAME PLACE.

IMPROVEMENT IN NUT-LOCKS.

Specification forming part of Letters Patent No. 181,716, dated August 29, 1876; application filed February 24, 1876.

*To all whom it may concern:*

Be it known that I, CHARLES PICKLES, of St. Louis, county of St. Louis, and State of Missouri, have invented a certain new and useful Improvement in Bolts and Nuts, which improvement is fully set forth in the following specification, reference being had to the accompanying drawings.

The object of my invention is to produce a complete lock-nut in itself, thereby dispensing with all auxiliary appliances, and instead of using any detached parts I make an interior groove, ranging from the top of the nut to the bottom, and providing the bottom with downward-projecting corners, to admit of a spring of the nut.

Figure 1:
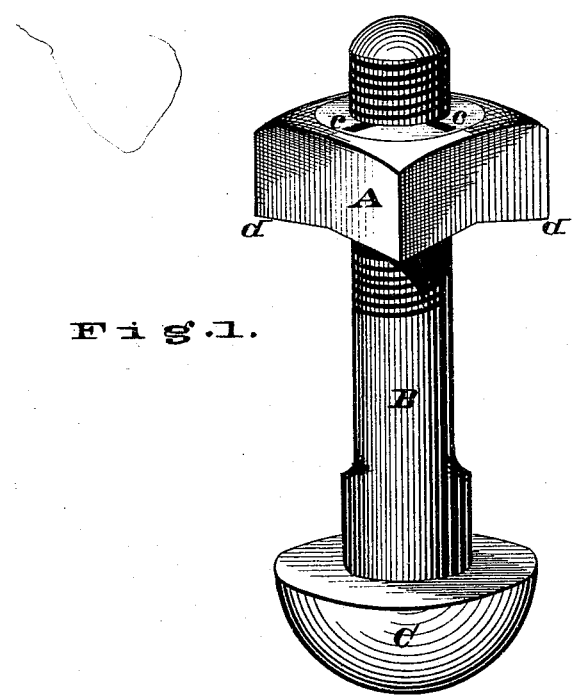
Figure 2:
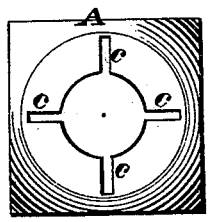
Figure 3:
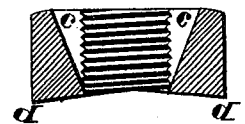

In the accompanying drawings, Figure 1 is a perspective view of a bolt with the nut in position. Fig. 2 is a plan view of the nut. Fig. 3 is a cross-section of same.

In the drawings, B is the bolt, of any usual form or construction. The nut A has two or more grooves, $c$, cut vertically down through the nut, the sides of which may be parallel or tapering, but preferably tapering, thus leaving a superfluity of metal at the bottom to prevent its springing at that point. The under surface of the nut is swaged or cut away, so as to leave sharp or acute corners $d$, which form the entire bearing-surface of the nut to be at its outer periphery, and this construction (while the nut is being screwed into place causes the top sections to spring inward) allows the nut to bind itself upon the threaded portion of the bolt-shank.

I am aware that nuts have been made with slots across the top and through the body of the nut. My experiments have proved this form of nut to be comparatively worthless, as the nut would lose its elasticity after having once been screwed into place, and could be readily removed with but little power, owing to the loss of elasticity through the tearing of the iron. With this form of slot the grain of the iron is cut, thus destroying the sides of the nut, allowing of too much spring, and thereby the closing of the slots and straining of the iron below the slots, causing it to tear asunder while being screwed into place.

Further, the amount of iron removed from the outer side of the nut where the greatest amount of strength is required materially weakens the strength of the nut and increases its liability to fracture.

In my improved construction of nut the iron is removed from the threaded portion, thus leaving the outer surface intact, so that it would not be liable to fracture; also, the elasticity is not affected by usage, owing to the unbroken outer surface. The groove being cut through the threaded portion of the nut allows it to lock firmly on the thread of the bolt, and retain its lock, owing to there being no outward spring of the top portion of the nut, as the whole outer surface of the same is left intact.

I claim as my invention—

1. The nut A, having the interior triangular-shaped slots $c$ passing through the threaded part of the nut, with projecting corners $d$, substantially as and for the purpose set forth.

2. The interior triangular-shaped slot $c$, formed in the nut, as and for the purposes set forth.

CHARLES PICKLES.

Witnesses:
T. H. PEABODY,
LEWIS B. BEACH.